United States Patent
Perkins et al.

(10) Patent No.: US 7,439,293 B2
(45) Date of Patent: Oct. 21, 2008

(54) FIRE RETARDANT SLOTWALL PANEL MATERIAL

(75) Inventors: Travis M. Perkins, Evansville, IN (US); Randall Jay Brown, Pickerington, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 799 days.

(21) Appl. No.: 10/747,421

(22) Filed: Dec. 29, 2003

(65) Prior Publication Data

US 2004/0159067 A1 Aug. 19, 2004

Related U.S. Application Data

(60) Provisional application No. 60/436,948, filed on Dec. 30, 2002.

(51) Int. Cl.
*C08K 3/22* (2006.01)
*C08L 27/06* (2006.01)

(52) U.S. Cl. .................................. 524/437; 524/567
(58) Field of Classification Search ............... 524/437, 524/569, 567
See application file for complete search history.

(56) References Cited

U.S. PATENT DOCUMENTS

| 4,096,116 | A | * | 6/1978 | Lawson | 524/382 |
|---|---|---|---|---|---|
| 4,160,793 | A | * | 7/1979 | Kraft et al. | 525/230 |
| 5,102,922 | A | * | 4/1992 | Kimura et al. | 521/145 |
| 6,043,312 | A | * | 3/2000 | Fagher et al. | 524/523 |
| 7,030,179 | B2 | * | 4/2006 | Patterson et al. | 524/13 |

* cited by examiner

*Primary Examiner*—Peter Szekely
(74) *Attorney, Agent, or Firm*—Tara M. Hartman; Michael D. Lafrenz

(57) ABSTRACT

A fire retardant slotwall panel material having multiple slots forming multiple slats on which brackets and other devices can be mounted. The composition of the material for extruding the slotwall panels comprises CPVC, PVC and a fire retardant so that the resulting product will meet at least one of the ASTM E84-01 and UL 723 fire retardant standards. The composition can comprise 60-100 PHR of CPVC, 40-0 PHR of PVC and 20-50 PHR of fire retardant that can be AL Trihydrate. The composition of the material can include other ingredients such as: 2.7-3.3 PHR Zeolite, 0.36-0.44 PHR Blowing Agent, 9-11 PHR Process Aid, 2.475-2.525 PHR Tin Stabilizer, 0.9-1.1 PHR Exter Wax, 0.9-1.1 PHR OPE Wax, 2.7-3.3 PHR Impact Modifier, and 2.7-3.3 PHR $TiO_2$.

16 Claims, 3 Drawing Sheets

FIRE RETARDANT SLOTWALL PANEL MATERIAL

This application claims the benefit of provisional application 60/436,948, filed on Dec. 30, 2002.

BACKGROUND OF THE INVENTION

1. Field of the Invention

The invention relates to a slotwall panel having multiple channels forming slots in which brackets and other accessories can be mounted, and, more particularly, to a fire-retardant slotwall, the composition for making the slotwall, and the method for making the slotwall.

2. Description of the Related Art

Slotwalls are widely used to organize a room or an area of a room. A slotwall has multiple, spaced horizontal grooves forming the "slots" of the slotwall. Mounting brackets and accessories are designed to be received within the grooves. The mounting brackets are used to secure various items to the slotwall. The mounting brackets typically have hooks or other structures designed to support various items. The mounting brackets can also have specific structures designed to mount a particular item.

The accessories mounted to a slotwall include a wide variety of items. An illustrative accessory is a cabinet or other storage bin-type item that can be mounted to the wall. The accessories are typically mounted to the slotwall by an integrated or custom bracket assembly. However, one of the mounting brackets could be used depending on the configuration of the accessory.

Slotwalls can be formed from multiple sheets or from multiple slats. In either case, the sheets or slats will have one or more grooves forming the slot for mounting the bracket or accessory. The sheets or slats are typically mounted directly to a framed wall or similar structure in a building.

The grooves generally have an L or T-shape cross-section, resulting in a lip or similar structure extending over the channel. A portion of the bracket or accessory is generally received within the channel such that it can bear against the lip to hold the bracket or excess for the within the channel.

The sheets and slats are typically manufactured by an extrusion process. Currently, the sheets or slats are typically extruded from PVC (polyvinyl chloride). One disadvantage of the sheets or slats made from the PVC is that they do not satisfy current fire retardant standards. It is desirable to have a slotwall formed by either sheets or slats that had the desired fire retardant characteristics well still retaining the desired structural characteristics.

SUMMARY OF THE INVENTION

The invention addresses the shortcomings of the prior art by providing a cost-effective and fire-retardant slotwall. In one aspect, the invention relates to a composition suitable for extruding a fire-retardant product. The composition comprises CPVC (chlorinated polyvinyl chloride),PVC, and a fire retardant, with the quantities CPVC, PVC, and fire retardant being selected such that a product made from the composition will meet at least one of the ASTM E84-01 and UL 723 fire retardant standards. The composition can include other ingredients, such as; 2.7-3.3 pph Zeolite, 0.36-0.44 pph Blowing Agent, 9-11 pph Process Aid, 2.475-2.525 pph Tin Stabilizer, 0.9-1.1 pph Ester Wax, 0.9-1.1 pph OPE (oxidated polyethylene) Wax, 2.7-3.3 pph Impact Modifier, and 2.7-3.3 pph TiO2.

In a preferred form, the composition comprises 50-100 pph of CPVC, 0-50 pph of PVC, and the fire retardant is of an amount sufficient such that the product made from the composition meets the fire-retardant standards.

Al Trihydrate can be used as the fire retardant and can comprise 0-50 pph of the composition.

In the currently most preferred form, the composition comprises 80 pph of CPVC, 20 pph of PVC, and 30 pph of Al Trihydrate.

In another aspect, the invention relates to a composition suitable for extruding a fire-retardant product, comprising 50-100 pph CPVC, 0-50 pph PVC, and a fire retardant in sufficient amount such that the product made from the composition is fire retardant.

The invention also relates to a slat for use in a slotwall, comprising a body having a front and a rear face; at least one channel formed in the body and opening onto the front face; and the body being made from a composition such that the body meets at least one of the ASTM E84-01 and UL 723 fire retardant standards.

The composition forming the body preferably comprises 50-100 pph of CPVC, 0-50 pph of PVC, and 0-50 pph of Al Trihydrate. In a currently most preferred form, the composition comprises 80 pph of CPVC, 20 pph of PVC, and 30 pph of Al Trihydrate.

The composition can include other ingredients, such as: 2.7-3.3 pph Zeolite, 0.36-0.44 pph Blowing Agent, 9-11 pph Process Aid, 2.475-2.525 pph Tin Stabilizer, 0.9-1.1 pph Ester Wax, 0.9-1.1 pph OPE Wax, 2.7-3.3 pph Impact Modifier, and 2.7-3.3 TiO2.

The invention also relates to a method for making a fire-retardant element of a predetermined configuration for use in a slotwall. The method comprises the steps of: forming a composition by mixing 50-100 pph of CPVC, 0-50 pph of PVC, and a fire retardant in a sufficient amount such that the element made from the composition meets at least one of the ASTM E84-01 and UL 723 fire retardant standards; extruding the composition to form a blank; and finishing the blank to form the element with the predetermined configuration.

The mixing can also include adding 0-50 pph Al Trihydrate as the fire retardant. The mixing can yet include the addition and mixing of 2.7-3.3 pph Zeolite, 0.36-0.44 pph Blowing Agent, 9-11 pph Process Aid, 2.475-2.525 pph Tin Stabilizer, 0.9-1.1 pph Ester Wax, 0.9-1.1 pph OPE Wax, 2.7-3.3 pph Impact Modifier, and 2.7-3.3 TiO2 along with the CPVC, PVC, and the Al Trihydrate.

In a preferred mixing process, the CPVC, Tin Stabilizer, and Zeolite are first mixed together until either the mixture temperature reaches a first predetermined temperature or for approximately 3 minutes. The Blowing Agent, Process Aid, Ester Wax, OPE Wax, Impact Modifier, TiO2 and the Al Trihydrate are then mixed with the CPVC, Tin Stabilizer, and Zeolite until either the mixture temperature reaches a second predetermined temperature, which is higher than the first predetermined temperature, or for approximately 3 minutes. The mixture is then cooled to a third predetermined temperature, which is lower than the second predetermined temperature, and the PVC is then added to and mixed with the mixture as it is cooled.

The finishing step can further comprise forming the blank into a shape having substantially the same cross section as the predetermined configuration. The forming step can included forming a channel in the blank suitable for use in a slotwall. After the initial forming, the blank is sized in accordance with the predetermined configuration. The sized blank is then pulled to reduce its thickness.

DESCRIPTION OF THE INVENTION

Figure 1:
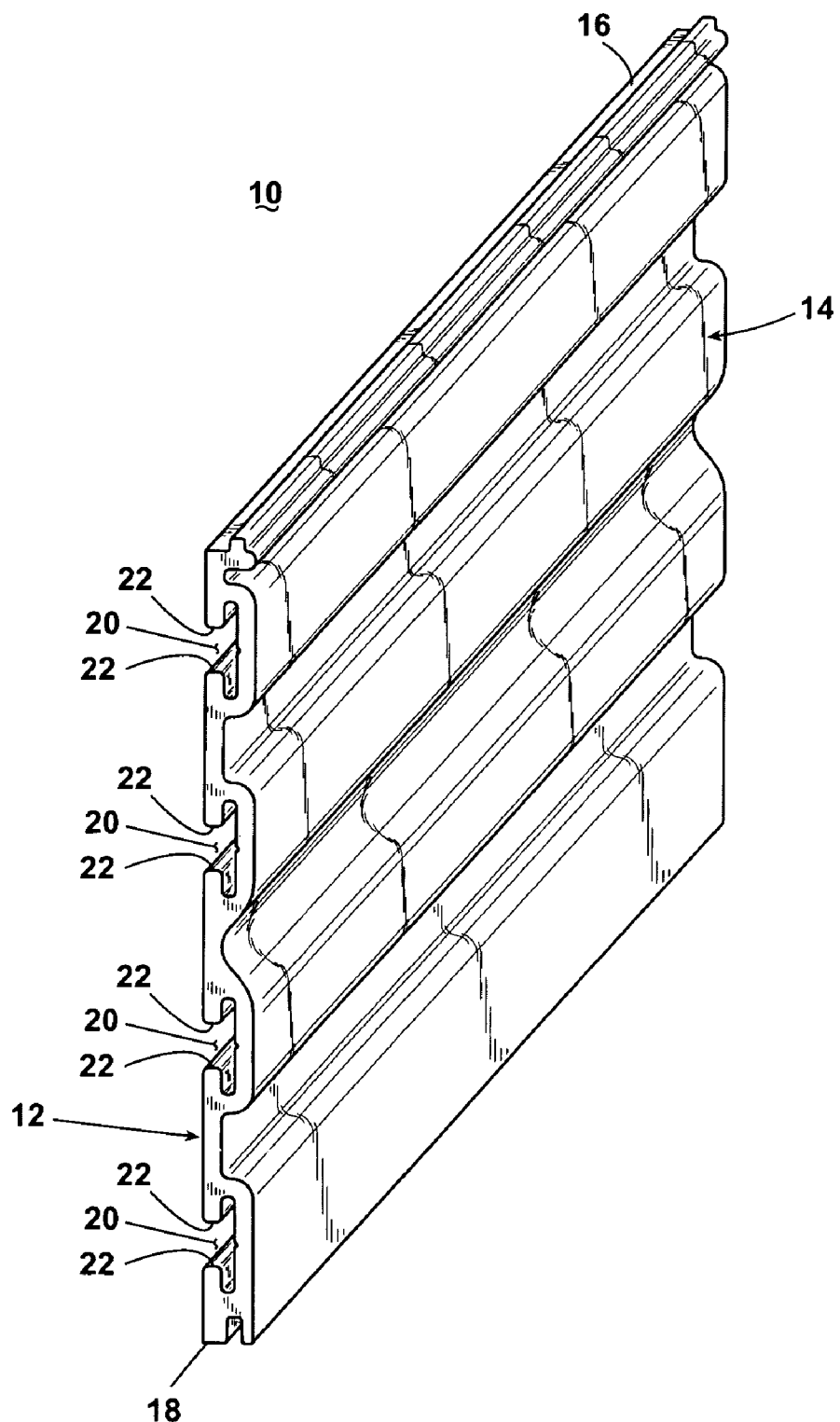
FIG. 1 is a partial perspective view of a slotwall panel for use in forming a slotwall in accordance with the invention.

FIG. 1 illustrates an extruded slotwall panel 10 suitable for forming a slotwall in accordance with the invention. The slotwall panel 10 can have a front face 12 and a rear face 14, and upper and lower edges 16, 18, respectively. A series of inverted T-shaped slots 20 can be formed in the slotwall panel 10 such that they open onto the front face 12 and define T-shaped slats 21 and two half slats 23 each having edges 22, which overlie the corresponding slot 20. The slotwall panel 10 can be used in a slotwall panel storage system as disclosed in pending U.S. patent application Ser. No. 10/331,826, filed on Dec. 30, 2002 and hereby incorporated herein by reference.

The front face 12 comprising slats 21 and half slats 23 is generally planar except where interrupted by the slots 20. The rear face 14 has an undulating surface that can follow the contour of the slots 20. The rear face 14 could have a planar surface with the recesses being filled by solid material. However, to reduce the weight of the overall slotwall and the cost of manufacturing, it is preferred to optimize the amount of material when making the slotwall panel 10.

The upper end 16 includes a longitudinal rib 24, which corresponds to a longitudinal recess 26 formed in the lower end 18. Slotwall panels 10 can be attached to a framed wall or similar building structure element, with horizontally orientated slotwall panels 10 stacked vertically such that the longitudinal rib 24 of one slotwall panel is received in the longitudinal recess 26 of the adjacent slotwall panel.

It is worth noting that while for simplicity sake the invention is described in the context of the extruded slotwall panel 10, the invention is not limited to any particular slotwall element, e.g. a panel, sheet, slotwall panel, etc. Nor is the invention limited to any particular configuration for a particular slotwall element.

Figure 2:
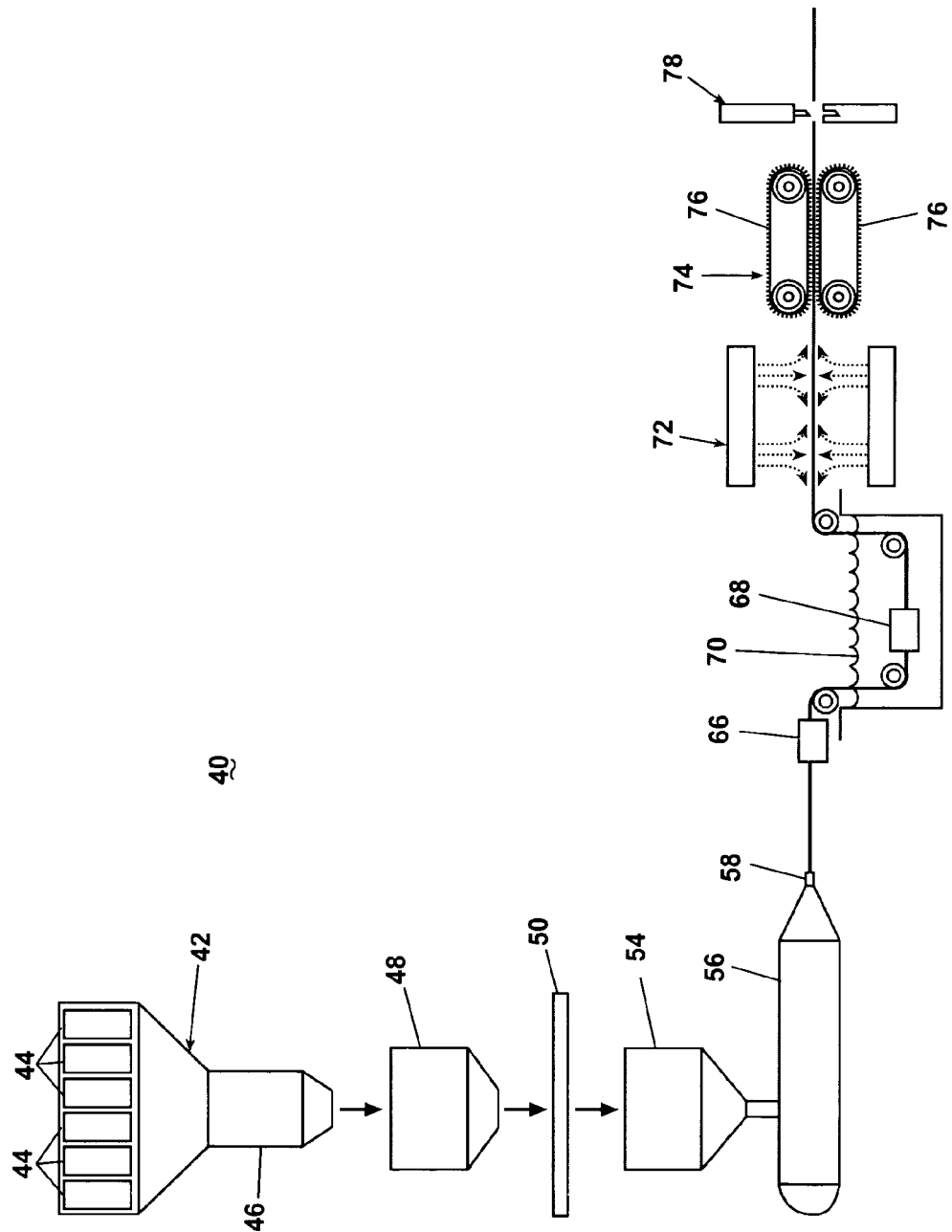
FIG. 2 is a schematic view illustrating an extrusion process suitable for forming the slotwall panels of FIG. 1.

The slotwall panel 10 can be extruded using a well-known extrusion apparatus 40, which is schematically illustrated in FIG. 2. The extrusion apparatus 40 can form a manufacturing line in which the raw ingredients forming the slotwall panel 10 are mixed, then extruded into the desired shape, and finally cut into the desired length. The extrusion apparatus 40 begins with a mixer 42, which mixes the various ingredients of the composition used to form the slotwall panel 10. The mixer 42 can be supplied the ingredients from multiple hoppers 44, each of which contains one of the elements of the composition forming the slotwall panel 10. The mixer 42 comprises a mixing chamber 46 that is connected to the hoppers 44. An agitator (not shown), that can be in the form of a rotating screw, can be provided in the mixing chamber 46 for stirring the ingredients. A heating element (not shown) or similar device can be provided with the mixing chamber 46 for heating the ingredients as they are stirred to form the extrusion composition.

The mixed ingredients can be fed to a cooler 48 to cool the mixture. The mixture is usually water-cooled and can include an agitator to continue the stirring of the mixture as it is cooled.

The cooled mixture can be fed through a screen 50 to remove any lumps or contaminants.

In order to form slotwall panels 10, the screened mixture can be fed to a hopper 54 of an extruder 56, which has a die 58 shaped to correspond to the cross-section of the slotwall panel 10, such that the material leaving the die 48 is roughly shaped to the slotwall panel 10. The mixed extrusion composition can be fed from the mixer 42 directly to the hopper 54. Alternatively, the mixed extrusion composition can be fed into a temporary container, whose contents are then fed into the hopper 54 of the extruder 56.

The extruder 56 can be a screw-type extruder, which can have one or multiple screws. The extruder 56 can also include a heating element (not shown) for heating the mixed extrusion composition as it passes through the extruder 56. The extruder 56 can have additional hoppers or similar devices for introducing elements into the mixture as it passes through the extruder 56. For example, a hopper 62 can be provided for adding a colorant.

The output or extrudate of the die 58 can be fed into a vacuum calibrator 66, which performs an initial shaping operation on the material. The vacuum calibrator 66 can be an exact negative of an oversized cross-section of the slotwall panel 10. Holes are formed in the vacuum calibrator and are connected to a low pressure source such that a vacuum is applied to the material as it passes through the vacuum calibrator. The vacuum draws the material against the surface of the vacuum calibrator to shape the extrudate as it slides through the vacuum calibrator. The vacuum calibrator 66 can be cooled by circulating cold water therethrough.

The material leaving the vacuum calibrator 66 can be fed to a sizer 68, which performs a final sizing operation on the material. The sizer 68 can be dimensioned to correspond almost identically to the dimensions of the final product, in this case the slotwall panel 10. The sizer 68 can be located within a water bath 70, which cools the extruded material.

After final sizing, the water remaining on the extruded material can be removed by passing the extruded material through a forced air station 72. The forced air station 72 blows pressurized air onto the surfaces of the extruded material to blow away any water remaining thereon.

After removing the excess water, the material can be stretched by a puller 74, which comprises a pair of tracks 76 between which the material passes. The tracks are rotated at a rate greater than the extrusion speed of the material, resulting in the stretching of the material as it passes through the puller 74.

The stretched material can be carried into a cutting station 78, which cuts the material into slotwall panels 10 of a desired length. The cutting station 78 can be a saw, but other types of cutters can be used. The slotwall panels 10 can then prepared for packaging and shipping.

One advantage of the slotwall panel 10 is that it is made from a composition that renders the slotwall panel 10 fire retardant or fire resistant. The term fire-retardant is used in this application, but those skilled in the art will understand that fire resistant could be used instead of fire-retardant to describe the properties of the slotwall panel material. The fire-retardant characteristic of a product, such as the slotwall panel 10, can be measured against known standards, which are currently ASTM E84-01 by ASTM, 100 Barr Harbor Drive, West Conshohocken, Pa. 19428-2959, and UL 723, by Underwriters Laboratories, Inc., 333 Pfingsten Road, Northbrook, Ill. 60062-2096.

Both of these standards are applicable to building construction materials and have a two-prong criteria for determining whether a product is fire retardant. The two prongs are the flame spread rate and the smoke generation. For a product to be flame retardant, it must meet or exceed the threshold values for both the flame spread and smoke generation. The composition used to make the slotwall panel 10 in accordance with the invention results in a product that satisfies both the flame spread and smoke generation requirements for the identified standards.

The threshold values for the flame spread and smoke generation vary depending on the class of building materials. The described standards include three Wall and Ceiling Finishes Classifications: A, B, C. Class C is applicable to residential garage construction and is the lowest of the three standards. The flame spread threshold values are 25 Class A, 75 for Class B and 200 for Class C. The smoke generation threshold value for all three classes is 450. As long as the flame spread and smoke generation values are less than or equal to these threshold values, the product is considered fire retardant for that class. For the slotwall panel 10 to be used in a slotwall panel storage system in a garage as disclosed in co-pending patent application US20020232, the term fire retardant means the slotwall panel 10, meets the threshold value for at least Class C.

The composition of one embodiment of the extruded slotwall panel 10 material according to the invention is set forth in Table 1, which lists the ingredients forming the composition, and for each ingredient, lists an exemplary sample, the Parts per Hundred of Resin by weight (PHR), and the percent weight of the entire composition.

TABLE 1

Composition

| Ingredient | Exemplary Material | PHR (by Weight) | % Weight |
|---|---|---|---|
| CPVC | Kaneka H727 | 80 | 52 |
| PVC | Georgia Gulf 5385 | 20 | 13 |
| Al Trihydrate | Aluchem AC400 | 30 | 19.5 |
| Zeolite | PQ Corp 401P | 3.0 | 1.95 |
| Blowing Agent | Bergen XO-118 | 0.4 | 0.25 |
| Process Aid | Rohm & Haas K400 | 10 | 6.5 |
| Tin Stabilizer | Rohm & Haas TM181 | 2.5 | 1.6 |
| Ester Wax | Cognis G70 | 1 | 0.65 |
| OPE Wax | Honeywell AC629A | 1 | 0.65 |
| Impact Modifier | Atofina DS | 3 | 1.95 |
| $TiO_2$ | DuPont R102 | 3 | 1.95 |
| Totals | | 153.9 | 100 |

The first two ingredients CPVC (chlorinated polyvinyl chloride) and PVC (polyvinyl chloride) form the resin mixture, which forms the core of the composition. The quantity of the remaining ingredients is referred to in terms of the resin mixture. For example, the resin mixture of the preferred composition comprises 80 parts by weight of CPVC and 20 parts by weight of PVC. The CPVC and PVC form 100% or 100 parts by weight of the resin mixture. The quantity (parts) of the remaining ingredients is described in terms of their relation to the resin mixture. For example, the Al Trihydrate is 30 parts by weight of the resin mixture. In other words, for every 100 lbs of resin mixture, 30 lbs of Al Trihydrate is added to the composition. The PHR values can be analogized to the measurements for a recipe to the composition.

The % Weight column shows the percentage of weight that the particular ingredient comprises of the entire composition. For example, the entire composition has 153.9 parts. The CPVC comprises 80 parts of the entire composition and 52% of the weight (80/153.9*100) of the composition.

The first three ingredients in the composition of the slotwall panel material (CPVC, PVC, and Al Trihydrate) impact the fire retardant characteristic of the resulting extruded slotwall panel 10. The remaining ingredients in the composition are known in the extrusion of PVC and their function is well known. Therefore, the discussion of the ingredients for the composition of the slotwall panel material will focus on the first three ingredients, which impact the fire retardant characteristic of the resulting product extruded from the composition.

CPVC and PVC, from a mechanical standpoint, have similar characteristics for those characteristics relevant to the extrusion of the slotwall panel 10. However, the CPVC and PVC differ in some of their flame retardant properties. While both CPVC and PVC have relatively low oxygen content, which retards the tendency for a flame to spread, CPVC does retard flame spread better than PVC. Of greater distinction are the smoke generation characteristics of the compounds. When exposed to fire, PVC generates a substantial amount of smoke, especially in comparison to CPVC. The smoke generation must be controlled to satisfy the fire retardant standards. The Al Trihydrate is added to the composition to help control the smoke generation.

The composition of the material of the embodiment of Table 1 balances multiple criteria for a marketable and fire retardant composition suitable for use in extruding a slotwall panel 10 for a slotwall storage system that can be used in residential construction. One consideration is to ensure that the resulting product made from the composition satisfies the fire retardant standards. Another consideration is the cost of the composition, which is impacted by the CPVC being substantially more costly than the PVC. Thus, the quantities of the preferred composition are inherently in conflict when the goal is to produce a low-cost, fire retardant slotwall panel. For example, it is desirable for cost reduction purposes to minimize the amount of CPVC used in the composition, which will result in an increase in the amount of PVC. However the increased PVC will negatively impact the fire retardant characteristic of the composition, especially the smoke generation characteristic, and require an increase in Al Trihydrate to reduce the smoke generation attributable to the increased PVC content. Of course, the addition of more Al Trihydrate in the composition necessarily results in an increased cost of the composition.

Slotwall panels 10 made from the composition of the embodiment of Table 1 easily meeting the fire retardant standards.

The composition illustrated in the embodiment of Table 1 strikes a balance between the competing criteria. However, variations in the quantities of the CPVC, PVC and Al Trihydrate from the quantities of the composition illustrated in the embodiment of Table 1 can be used and still achieve a cost-effective and fire-retardant slotwall panel 10 for a slotwall storage system. It has been found that the CPVC can vary between 60 to 100 parts of the resin mixture, the PVC can correspondingly vary between 40 to 0 parts of the resin mixture, and the Al Trihydrate can very between 20 to 50 parts of the composition and still yield a desirable fire retardant product. While Al Trihydrate is the fire retardant in the composition of the embodiment of Table 1, other fire retardants can be used in its place.

Table 2 illustrates the impact on the flame spread and smoke generation characteristics in response to variations in the amount of CPVC, PVC, and Al Trihydrate. The samples in Table 2 are identical except for the variation of CPVC, PVC, and Al Trihydrate.

TABLE 2

Effect on Flame Spread and Smoke Generation as a function of the variation in CPVC, PVC, and Al Trihydrate

| Sample | CPVC (PHR) | PVC (PHR) | AL Trihydrate (PHR) | Flame | Smoke |
|---|---|---|---|---|---|
| 1 | 100 | 0 | 15 | 9.20 | 389.00 |
| 2 | 100 | 0 | 30 | 9.80 | 183.00 |
| 3 | 100 | 0 | 45 | 7.30 | 160.00 |
| 4 | 80 | 20 | 30 | 9.00 | 313.60 |
| 5 | 75 | 25 | 15 | 10.20 | 615.00 |
| 6 | 75 | 25 | 30 | 9.72 | 359.10 |
| 7 | 75 | 25 | 45 | 12.50 | 339.00 |
| 8 | 50 | 50 | 15 | 10.30 | 878.00 |
| 9 | 50 | 50 | 30 | 8.12 | 515.10 |
| 10 | 50 | 50 | 45 | 6 | 299 |

The data shows that the smoke score improves as more Al Trihydrate is added, Also, the flame spread and and smoke generation scores worsen as the relative amount of PVC is increased. However, flame retardant samples can still be achieved with high percentages of PVC when used in combination with a large amount of Al Trihydrate, see sample 10.

Table 3 illustrates the currently known range of quantities for the ingredients of the composition that will result in a satisfactory flame-retardant product when extruded.

TABLE 3

Ranges in Ingredients for the Composition

| Ingredient | Exemplary Material | PHR (by Weight) |
|---|---|---|
| CPVC | Kaneka H727 | 50-100 |
| PVC | Georgia Gulf 5385 | 50-0 |
| Al Trihydrate | Aluchem AC400 | 15-50 |
| Zeolite | PQ Corp 401P | 2.7-3.3 |
| Blowing Agent | Bergen XO-118 | 0.36-0.44 |
| Process Aid | Rohm & Haas K400 | 9-11 |
| Tin Stabilizer | Rohm & Haas TM181 | 2.475-2.525 |
| Ester Wax | Cognis G70 | 0.9-1.1 |
| OPE Wax | Honeywell AC629A | 0.9-1.1 |
| Impact Modifier | Atofina DS | 2.7-3.3 |
| $TiO_2$ | DuPont R102 | 2.7-3.3 |

The invention lies in the proportion of the CPVC, PVC and Al Trihydrate forming the composition. The processing of the composition from raw materials to finish product done in accordance with the invention ensures that the end product will have desired structural and fire retardant characteristics.

Figure 3:
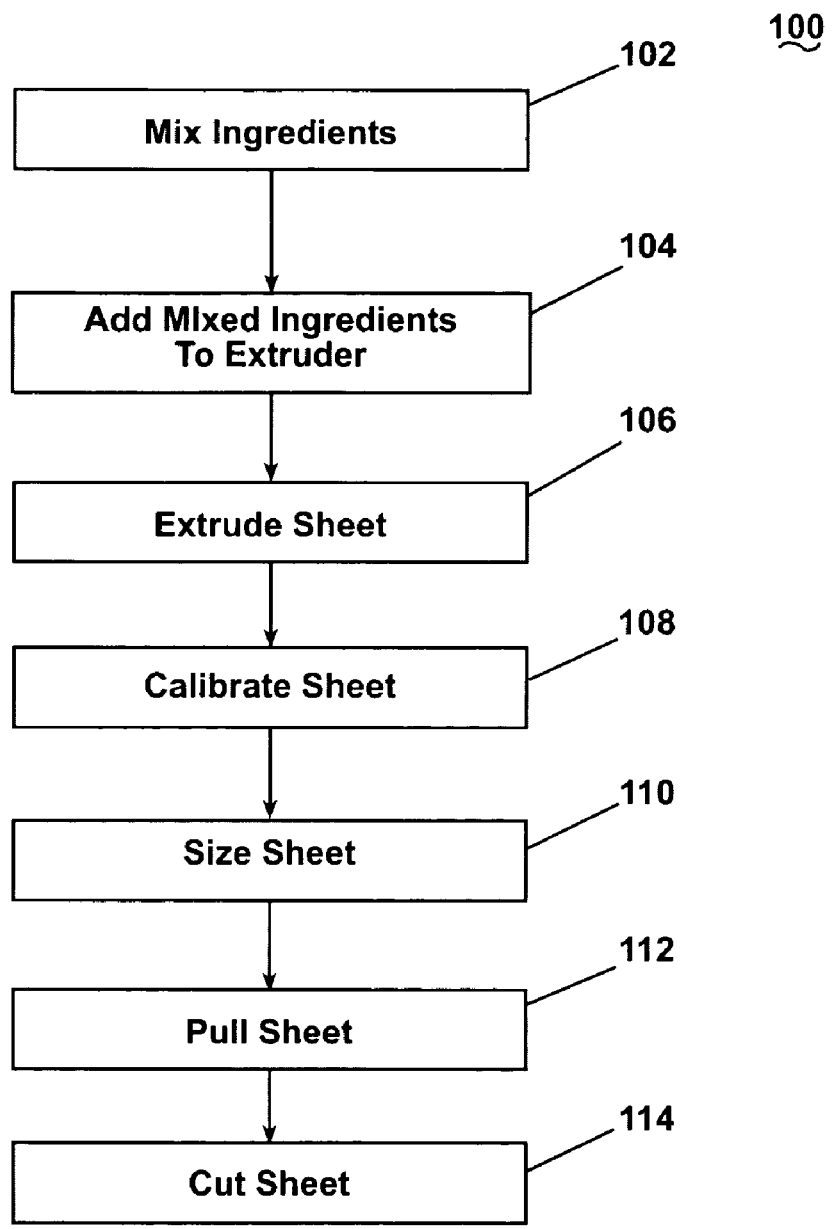
FIG. 3 is a flowchart illustrating the major steps for the extrusion process of FIG. 2.

FIG. 3 illustrates the main steps in the process 100 for taking the raw materials of the composition of the embodiment of Table 1 and converting them into a finished product. The process 100 begins by mixing the raw ingredients of Table 1 at step 102. The mixing step 102 is complicated because of the different characteristics of the materials mixed. Most notably, PVC is susceptible to degradation or damage at a much lower temperature than CPVC. Care must be taken during the processing to make sure the PVC is not damaged.

The mixing step 102 begins by adding the CPVC, tin stabilizer, and Zeolite into the mixer 42 as quickly as possible. The three ingredients can be mixed at high speed until the temperature of the mixture reaches approximately 175 F, which takes approximately three minutes. The remaining ingredients, except for the PVC, can then be added in the order as listed in table 1, except that the Al Trihydrate can be added after the process aid. The resulting mixture can then be mixed in the mixer 42 on high speed until the temperature reaches 220 F, which takes approximately three minutes.

The mixture can then be cooled to approximately 130 F, such as by placing the mixture into a standard, water-jacketed, ribbon blender-type cooler. The PVC can then be added to the mixture in the cooler and blended with the other materials while the mixture is cooled to approximately 130 F, which takes approximately six minutes.

Once the mixing of all the ingredients is completed and the composition is cooled to the desired temperature, the composition can be passed through screen 50 to screen out any lumps or contamination. A 20 mesh screen can be used. After the material is screened, it can be transferred directly to the hopper 54 of the extruder 56 at step 104. Alternatively, the composition can be pre-mixed prior to the time for extrusion and stored in suitable containers, such as polyethylene lined boxes, with the liner being closed after filling.

The composition in the hopper 54 of the extruder 56 can be extruded through the die 58 at step 106 to form an extrudate. The extrudate leaving the die 58 can be thought of as a continuous blank, which is formed and sized in subsequent finishing steps.

The extrudate exiting the die 58 can then be passed through the vacuum calibrator 66 to form the blank at step 108. The vacuum of the vacuum calibrator 66 pulls the blank against the vacuum calibrator 66 to form the blank into the general shape of the slotwall panel 10. The blank can be cooled while being calibrated since the vacuum calibrator 66 is cooled.

The calibrated blank can then be sized at step 110 by pulling the calibrated blank through the sizer 68, which has an opening with cross section similar in shape to the cross section of the slotwall panel 10, except slightly larger. The sizer 68 functions in a manner similar to a die. Since the sizer is positioned within a water bath, the blank can be cooled as it passes through the sizer 68.

The sized blank can then be pulled at step 112 to stretch the blank and slightly reduce its thickness. The pulling of the sized blank can be accomplished by passing the sized blank between the tracks 76.

After the pulling step 112, the pulled blank can be cut at step 114 into the desired length to form the slotwall panel 10. Preferably the cutting can be accomplished by using a saw. However, any cutting device (shears, laser, etc.) can be used. The slotwall panels 10 can then be packed for delivery.

The same main steps in the process 100 can be used for taking raw materials from the range of composition percentages set forth in Table 3 in the same manner as for the composition of the embodiment of Table 1 to form slotwall panels 10.

While the invention has been specifically described in connection with certain specific embodiments thereof, it is to be understood that this is by way of illustration and not of limitation, and the scope of the appended claims should be construed as broadly as the prior art will permit.

We claim:

1. A composition suitable for extruding a fire-retardant product, comprising 60 PHR or more of CPVC (chlorinated polyvinyl chloride), 40 PHR or less, but present, of PVC (polyvinyl chloride), and a fire retardant, with the quantities of the CPVC, PVC, and fire retardant being selected such that a product made from the composition will meet at least one of the ASTM E84-01 and UL 723 fire retardant standards.

2. The composition of claim 1 comprising a fire retardant in an amount sufficient such that the product made from the composition meets the fire-retardant standards.

3. The composition of claim 2 wherein the fire retardant is Al Trihydrate.

4. The composition of claim 3 wherein the Al Trihydrate comprises 15-50 PHR of the composition.

5. The composition of claim 4 wherein the Al Trihydrate comprises at least 20 PHR.

6. The composition of claim 4 wherein the CPVC comprises substantially 80 PHR of the composition.

7. The composition of claim 6 wherein the PVC comprises substantially 20 PHR of the composition.

8. The composition of claim 7 wherein the Al Trihydrate comprises substantially 30 PHR of the composition.

9. A composition suitable for extruding a fire-retardant product, comprising:
  60 or more CPVC (chlorinated polyvinyl chloride),
  40 or less PHR, but present, PVC (polyvinyl chloride), and
  a fire retardant in sufficient amount such that the product made from the composition is fire retardant.

10. The composition of claim 9 comprising substantially 80 PHR CPVC.

11. The composition of claim 10 comprising substantially 20 PHR PVC.

12. The composition of claim 11 wherein the fire retardant is Al Trihydrate.

13. The composition of claim 12 wherein the Al Trihydrate comprises 20-50 PHR.

14. The composition of claim 13 comprising substantially 30 PHR Al Trihydrate.

15. The composition of claim 8 and further comprising at least one of the following ingredients:
  2.7-3.3 PHR Zeolite,
  0.36-0.44 PHR Blowing Agent,
  9-11 PHR Process Aid,
  2.475-2.525 PHR Tin Stabilizer,
  0.9-1.1 PHR Ester Wax,
  0.9-1.1 PHR OPE (Oxidized Polyethylene) Wax,
  2.7-3.3 PHR Impact Modifier, and
  2.7-3.3 PHR $TiO_2$.

16. The composition of claim 14 and further comprising at least one of the following ingredients:
  2.7-3.3 PHR Zeolite,
  0.36-0.44 PHR Blowing Agent,
  9-11 PHR Process Aid,
  2.475-2.525 PHR Tin Stabilizer,
  0.9-1.1 PHR Ester Wax,
  0.9-1.1 PHR OPE (Oxidized Polyethylene) Wax,
  2.7-3.3 PHR Impact Modifier, and
  2.7-3.3 PHR $TiO_2$.

* * * * *